United States Patent
Andela

[19]

[11] Patent Number: 5,944,268
[45] Date of Patent: Aug. 31, 1999

[54] MULTI-FLAIL GLASS PULVERIZER

[75] Inventor: James Andela, Richfield Springs, N.Y.

[73] Assignee: Andela Tool & Machine, Inc., Richfield Springs, N.Y.

[21] Appl. No.: 08/985,285

[22] Filed: Dec. 4, 1997

Related U.S. Application Data

[63] Continuation-in-part of application No. 08/640,855, May 10, 1996, abandoned.

[51] Int. Cl.[6] ..................................................... B02C 13/28
[52] U.S. Cl. .............................. 241/99; 241/187; 241/193
[58] Field of Search .............................. 144/208.7, 24.13; 241/285.1, 194, 187, 195, 188.1, 193, 99, 275

[56] References Cited

U.S. PATENT DOCUMENTS 2,965,320 12/1960 Pierson .
3,252,276 5/1966 Brewer .
4,756,484 7/1988 Bechler et al. ........................ 241/275

FOREIGN PATENT DOCUMENTS 678225 7/1939 Germany ................................ 241/194

*Primary Examiner*—Mark Rosenbaum
*Attorney, Agent, or Firm*—Michael de Angeli

[57] ABSTRACT

The invention relates to a glass pulverizer 6 in which two rotatable flail assemblies 39 and 46 are housed within two contiguous drum-like housings 8 and 16 respectively. One housing 8 has an inlet 10 on one end and the other housing 16 has an outlet 20 located on an end furthest from the end adjacent the inlet. The housing 8 having an outlet 20 is longer than the other housing 16 thereby allowing the pulverized glass to exit the device in a relatively low speed and controlled manner. The flails may be of chain or single-link type, and are designed for ready replacement in the event of wear or damage. Replaceable liners are provided within the cylindrical housings.

17 Claims, 5 Drawing Sheets

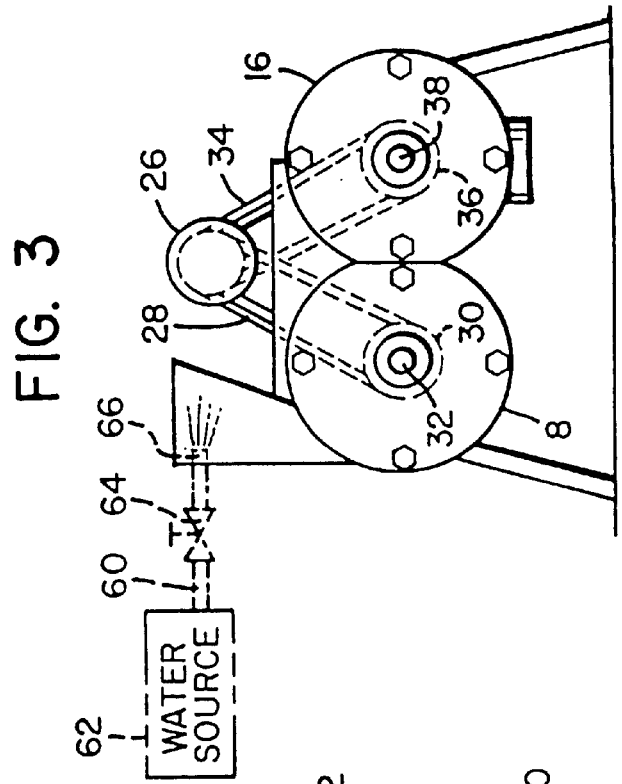
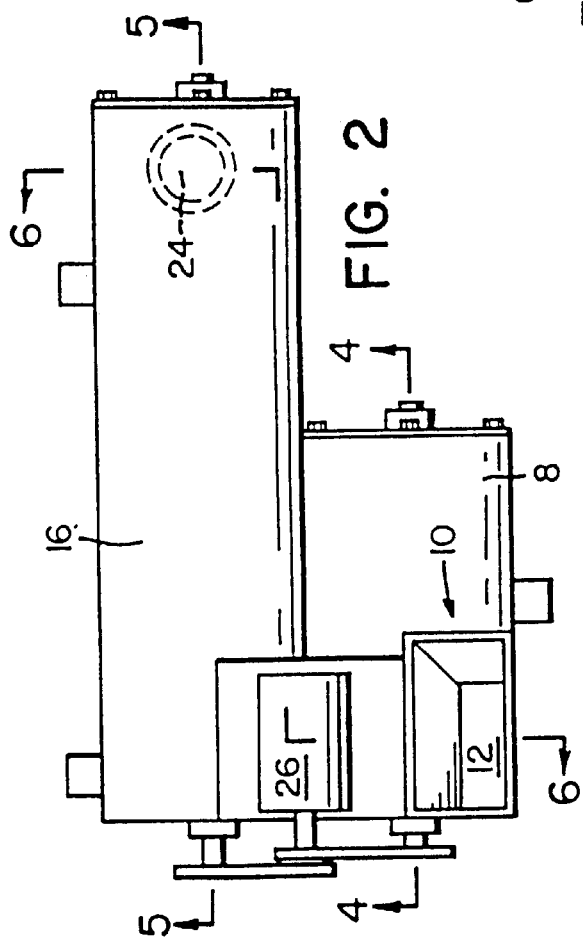
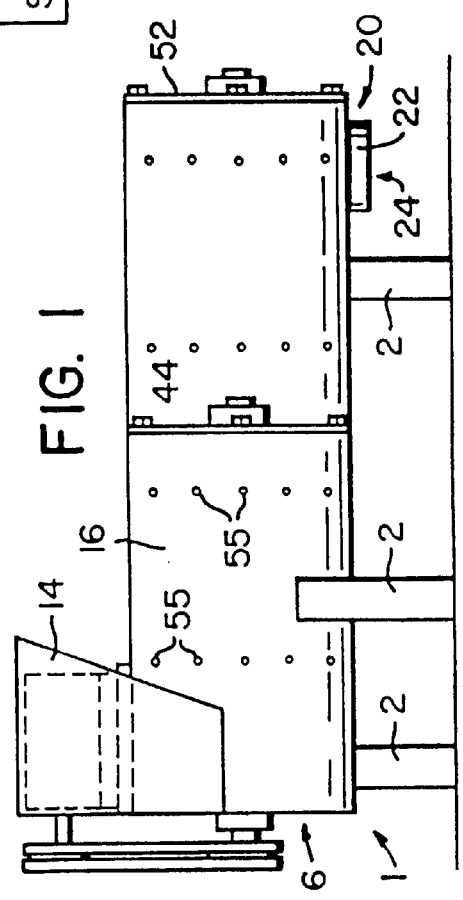

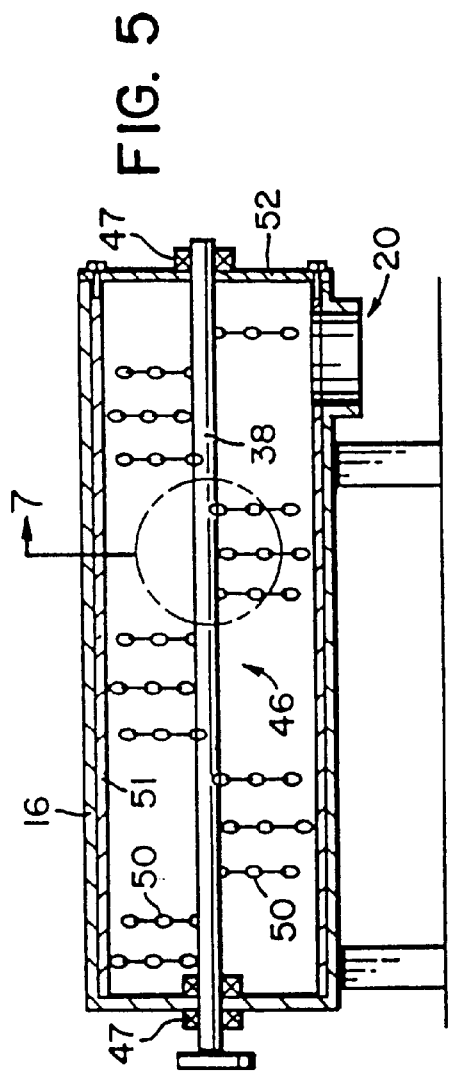
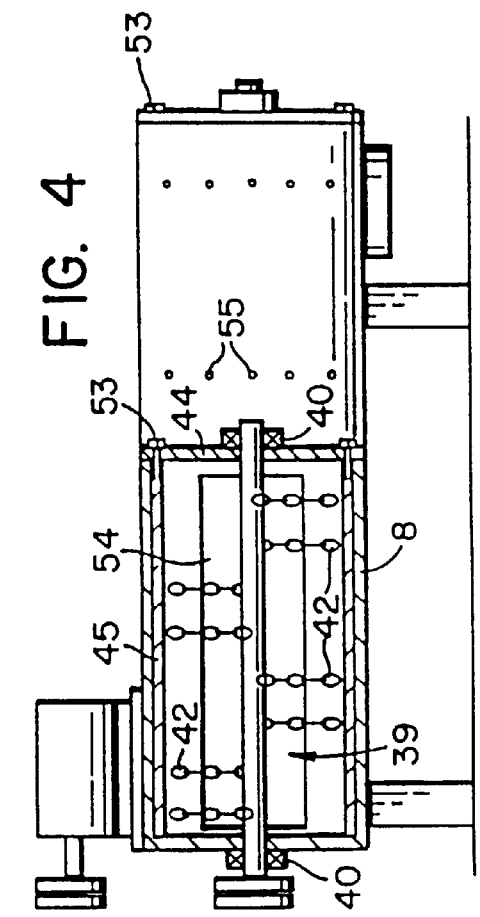
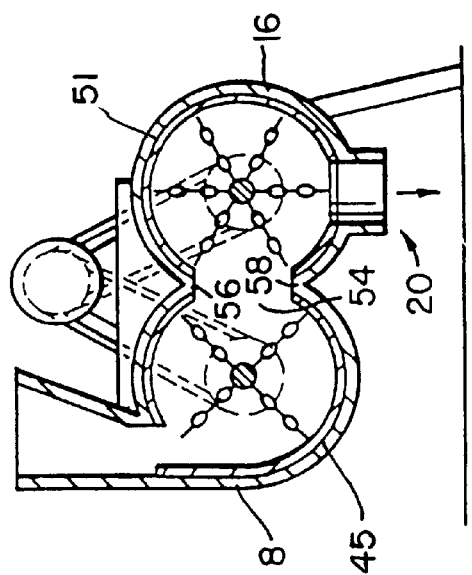

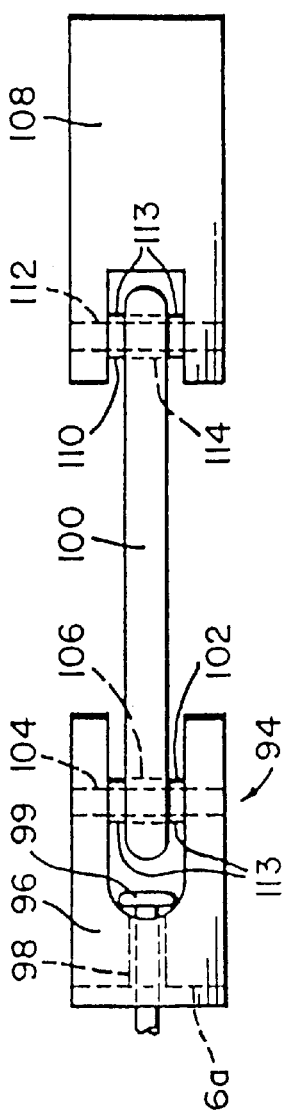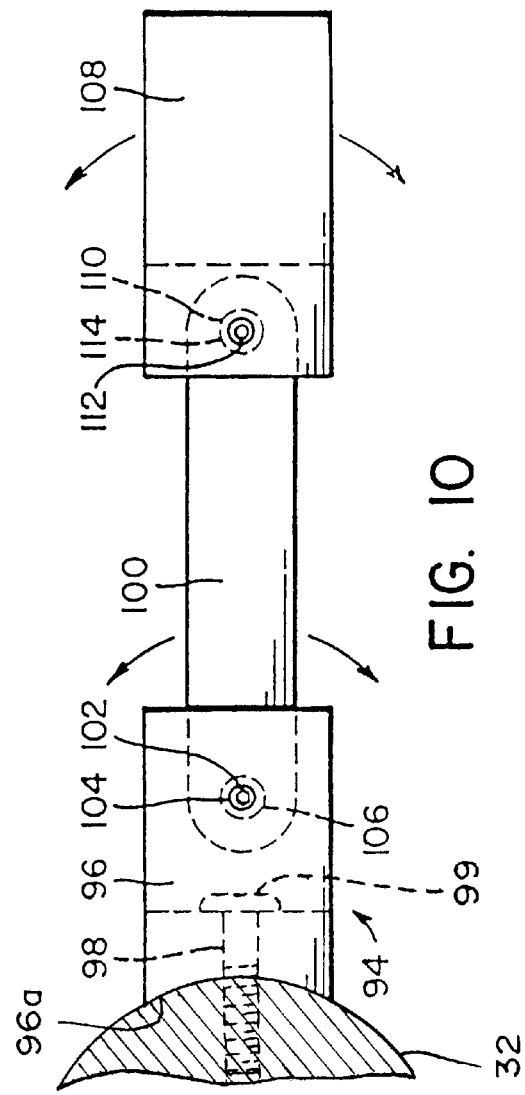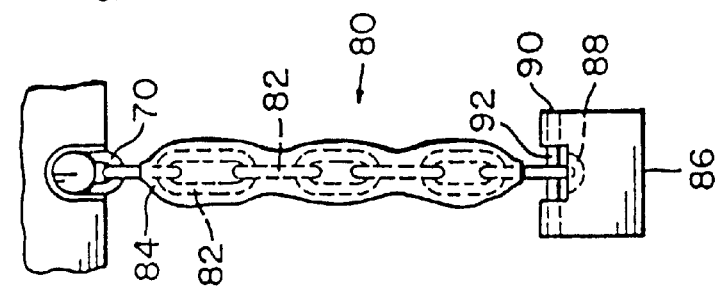

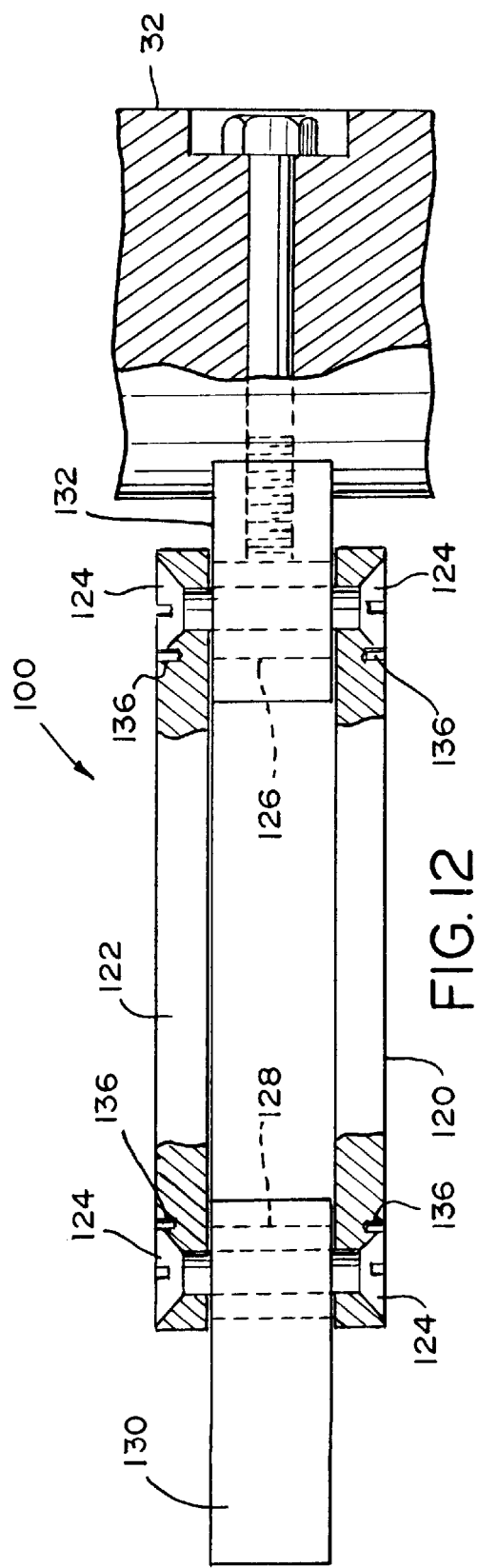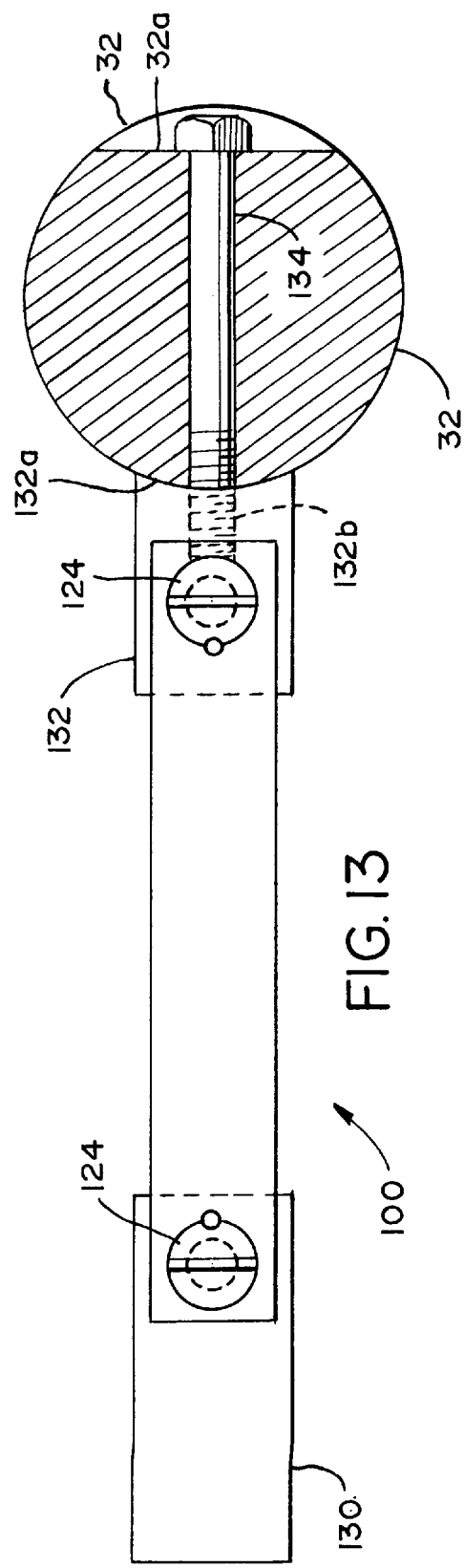

MULTI-FLAIL GLASS PULVERIZER

CROSS-REFERENCE TO RELATED APPLICATION

This application is a continuation-in-part of Ser. No. 08/640,855, filed May 10, 1996, now abandoned.

FIELD OF THE INVENTION

The invention is in the field of apparatus for comminuting materials. More specifically, the invention is a glass pulverizer that employs two drum-shaped housings oriented in a side-by-side contiguous fashion. Within each housing is a rotatable flail assembly comprising a central rotor to which a plurality of flexible flail members are attached in a spiral configuration.

BACKGROUND OF THE INVENTION

Numerous machines have been developed specifically for comminuting empty glass containers. By breaking containers into fragments, the recycling or disposal of glass material is facilitated. Machines developed for this purpose typically include an inlet opening through which the glass containers are inserted and an outlet opening through which the broken glass fragments and glass dust are ejected. To accomplish the breaking of the glass, these machines usually employ either a crushing apparatus or a hammermill form of breaker apparatus.

A significant problem with prior art machines that employ a crusher-type apparatus is a susceptibility of the machine to jamming when metal or plastic is inadvertently dropped into the machine's inlet. To overcome this difficulty, the machine will either have the ability to crush the metal, or it will include an automatic dump apparatus that allows the machine to purge its contents when the anvil of the crushing mechanism meets an unusual resistance. Both of these solutions add an undesirable measure of complexity and expense to the device.

In machines that employ a hammermill type of breaking apparatus, frequent and expensive maintenance is often required. The hammermill is usually comprised of a number of rigid metal "hammers" that are mounted on the exterior surface of a central rotatable shaft. Each hammer must be sharp and straight for the machine to operate efficiently. However, during use the individual hammers rapidly become dulled. In addition, metal objects inadvertently fed into the device can bend or break the hammers, necessitating repair or replacement of the damaged hammers.

One modification that has been used somewhat successfully in overcoming the failings of the prior art hammermills is the use of flexible hammers or "flails" in lieu of rigid hammers. The flexible flails are typically in the form of sections of conventional multi-link chain attached to the machine's central shaft in a spaced-apart configuration. The chains break the glass and allow any metal fragments or metal containers to rapidly pass through the device without causing any damage.

The flexible chain type of hammers, while providing a number of advantages over the prior art rigid hammers for hammermills, still suffer a number of failings. Firstly, the degree of comminution is uncontrolled, and as a result relatively large diameter fragments of glass are often ejected from the device outlet. Since the outputted material includes these large glass shards or fragments mixed with the smaller glass particles, the material cannot be easily recycled and is difficult to handle. For example, a major use of pulverized glass is in road construction where the pulverized glass is mixed with asphalt or similar materials. The large glass fragments would make the mixture unsuitable for this application.

A second problem with prior art chain-type hammermills is that the layout of the device normally requires either a gravity or blower induced flow of material through the device in order to prevent the material from clogging the unit. As a result, the machine requires a large foundation. In addition, use of a blower to enhance flow through the device entails a significant increase in operating and maintenance costs.

A third problem with prior art devices is that the flowpath of the material within the machine is inefficient and uncontrolled. This results in the high speed ejection of minimally broken material from the device's outlet. This high speed material can cause damage to whatever container or surface is being used to receive the broken glass.

Furthermore, present methods of fastening chain-type flexible flail hammers to the rotatable shaft can cause premature wear in both the attachment end of each flail and in the shaft itself. This can necessitate early replacement of the flails and/or replacement or machining of the shaft.

Finally, the conventional chain from which multilink chain flails are fabricated is not normally manufactured of hardened steel; chain flails used in the harsh glass comminution service typically require replacement at inconveniently short intervals.

SUMMARY OF THE INVENTION

The invention is a glass pulverizer that employs two multi-flail assemblies. Each assembly is located in a separate drum-shaped housing with the two housings having contiguous side edges. The unit has a feed inlet situated on a top surface of one of the housings and an outlet located on a bottom surface of the other housing. Each multi-flail assembly comprises a rotatable shaft oriented along the associated housing's longitudinal axis. In the area where the two housings are joined together, complementary openings in the two housings form a conduit to allow the initially broken glass to pass back and forth between the two housings and their associated flail assemblies.

Each of the two housings are supported on a common foundation and are parallel to each other. The two housings are identical in diameter but have distinctly different lengths. The second housing extends outwardly past the first housing and it is in the bottom of the outwardly extending portion in which the device's outlet is located.

Preferably, each housing includes an interior liner of a plastic material such as polyurethane. The liner is expendable and is primarily designed to absorb the impact and cutting forces caused by the inputted materials as they rebound off the interior surface of the housings. In this manner, the liner protects the interior surface of the associated housing. The design of the liners is relatively simple, allowing replacement liners to be conveniently fabricated of planar material. The end of each housing is removable to facilitate replacement of the lining. In addition, when the end of a housing is removed, the housing's flail assembly can be easily removed through the end of the housing.

The two multi-flail assemblies are oriented in a parallel manner and are centered within their associated housings. Attached to the rotatable shaft of each flail assembly are a plurality of separate, flexible flails. The flails are oriented on the shaft in a spiral fashion so that when the shaft is spinning, the flails extend away from the shaft and assume a spiral configuration about the shaft. The spiral orientation causes the assemblies to also function as an auger to move the broken glass along the device in the direction of the outlet.

The flails can be in the form of multi-link chains, wire ropes or pivotable links to which pivotable hammer members may be attached. Optionally, the chain flails can be encased in a plastic material to reduce wear and prevent direct contact between the flail's flexible connection points and the glass particles.

The chain flails are secured to the associated rotatable shaft using a removable fastener. The shaft includes a slot at each location where a flail is attached. Each slot has a smooth bottom surface and rounded end and is complementary in shape to the end link of the chain flail. Placing the end link in the slot assures the correct orientation in the spiral for the proper function as an auger. By rigidly securing the end of the flail, the incidence of wear at the end of the flail and in the shaft is significantly reduced.

In another embodiment, the flails may be in the form of a flexible three piece unit. The disclosed flail includes a specially designed end member for attachment to the shaft. The end member is fastened to the shaft using a fastener assembly. One end surface of the end member is arcuate, to mate with the cylindrical surface of the drive shaft. The end member is pivotally engaged to one end of a rigid link, which may comprise a single member or two parallel members. The outer end of the link includes a pivotally engaged hammer member. The end member, link, and hammer are all fabricated of hardened steel material.

The layout of the device is uniquely adapted to control the through-flow and degree of pulverization of the glass. When the glass initially enters the first housing, it is rapidly broken into large pieces by the first flail assembly. The glass fragments are then directed into an "impact zone" located in the area where the two housings are joined. In this area, the glass bounces back and forth between the first and second flail assemblies until the fragments have been reduced in size with approximately ninety-five percent of the particles having a diameter between 10 millimeters and 0.1 millimeters. At the same time, the pulverized glass is drawn by the auger-type action of the flail assemblies toward the outer end of the device and eventually to the extreme outer end of the second housing where the outlet is located.

By the time the fragments reach the machine's outlet, they have been pulverized so that they form a non-sharp cubic aggregate. The aggregate is moving at a relatively low speed and in a controlled fashion. The material then exits the machine via the outlet and falls into a collector placed below the device. In lieu of a collector, the material may be directed onto a conveyer which brings the aggregate to another machine for further processing.

The apparatus of the invention optionally includes a water spray unit that directs a stream of water onto the glass as it enters the first housing and is initially broken. The water does not adversely affect the comminution process and functions to reduce the incidence of airborne glass dust that would otherwise be produced by the unit.

To rotate the flail assemblies, a single motor is connected to both rotatable shafts via a belt and pulley system. The belts and pulleys are arranged so that both shafts and therefore both chain flail assemblies spin in the same direction. Alternatively, each flail assembly can be provided with its own motor.

Due to the design of the device, gravity or blowers are not required to move the pulverized glass through the unit. This allows the user to dispense with the significant structure normally required to support the unit and also to avoid the cost of devices dedicated to the moving of the glass.

BRIEF DESCRIPTION OF THE DRAWINGS

FIG. 1 is an elevational view of the apparatus of the invention.

FIG. 2 is a plan view of the apparatus shown in FIG. 1.

FIG. 3 is an end view of the apparatus shown in FIG. 1. A liquid spray system that can optionally be added to the apparatus is shown in phantom in this figure.

FIG. 4 is a partially cross-sectioned elevational view of the invention of FIG. 1 taken through the first housing.

FIG. 5 is a cross-section elevational view of the invention shown in FIG. 1 taken through the second housing.

FIG. 6 is a cross-sectional end view of the invention shown in FIG. 1 taken at a point proximate the end of the housings shown in FIG. 3.

FIG. 9 is a side view of an alternate embodiment of a chain flail.

FIG. 10 is a side view of a first embodiment of a single-link flail.

FIG. 11 is a top view of the flail shown in FIG. 10.

FIG. 12 is a side view of a second embodiment of the single-link flail.

FIG. 13 is a top view of the flail of FIG. 12.

DETAILED DESCRIPTION OF THE DRAWINGS

Figure 8:
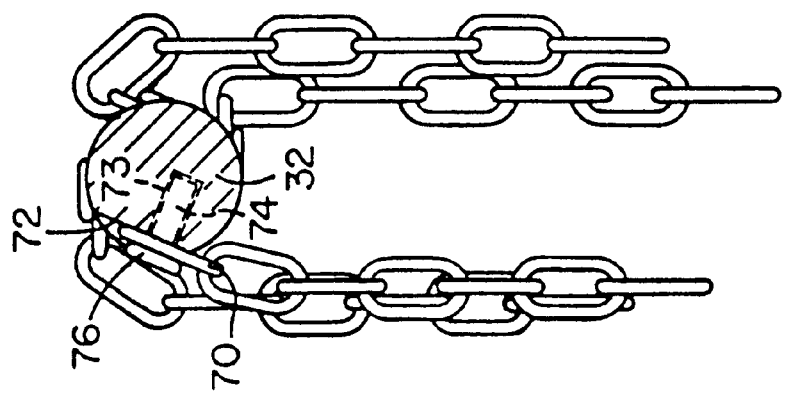
FIG. 8 is an end view of the flail assembly portion shown in FIG. 7.

Referring now to the drawings in greater detail, wherein like reference characters refer to like parts throughout the several figures, there is shown by the numeral 1 a glass pulverizer unit. The unit includes a support framework 2 upon which the pulverizer apparatus 6 rests.

As can be seen in FIGS. 1 and 2, the pulverizer apparatus comprises a first cylindrical drum-like housing 8 that includes a top mounted inlet structure 10. The inlet structure has a central opening 12 that is surrounded by a funnel-shaped wall structure 14. Contiguous to the first drum-shaped housing 8 is a second cylindrical drum-like housing 16.

The second housing 16 is oriented such that its longitudinal axis is parallel to the longitudinal axis of the first housing. Located on the bottom surface of the second housing is an outlet structure 20. The outlet includes a circular wall structure 22 that surrounds a central opening 24.

FIG. 3 provides an end view of the apparatus in which the unit's drive mechanism can be seen. The drive mechanism includes a top mounted motor 26 that is connected by a first belt 28 to a pulley 30 that is mounted on a rotatable shaft 32. A second belt 34 connects the motor to a pulley 36 that is mounted on a second rotatable shaft 38. When the motor is operating, the belts cause shafts 32 and 38 to turn in the same direction. Alternatively, but not shown, two motors may be employed with one motor connected by pulley and belt to shaft 32 and the other motor connected by pulley and belt to shaft 38.

FIG. 4 provides a cross-sectional view of the first housing 8 shown at a time when the shaft is spinning. Within the housing is a flail assembly 39 comprising a central shaft 32 that is located proximate the housing's longitudinal axis and supported at each end by bearings 40. The bearings are secured to the housing. The flail assembly further comprises a plurality of flexible flails 42 that are each removably attached to shaft 32 by removable fasteners. In the embodiment shown, the flails are in the form of multi-link lengths of chain (as detailed in FIG. 7). Each flail 42 is attached to the shaft so that it is displaced from any adjacent flails in both radial and axial directions, as shown. The flails are thereby located so that when the shaft is rotating, the centrifugal force causes the flails to extend outwardly and collectively form a spiral auger shape.

The spiral auger shape formed by the flail assembly when it is rotating performs two functions. Firstly, it causes an effective and controlled comminution of the inputted glass containers and/or glass fragments. Secondly, it causes the glass to move from the inlet opening 12 toward an outer end 44 of the housing in a direction parallel to the housing's longitudinal axis.

Also located within the housing is a readily replaceable liner 45. The liner fits snugly against the interior surface of the housing and protects it from being damaged by direct contact with the high speed glass and/or metal fragments. Where the liner is fabricated of plastic sheet, as in one preferred embodiment, sheet metal screws 55 hold the liner in place, yet allow its ready removal for replacement when worn or damaged.

FIG. 5 provides a cross-sectional view of the second housing 16 shown at a time when the shaft is spinning. In this view, one can see a flail assembly 46 located within housing 16 that is substantially identical to flail assembly 39 except that it is longer. This second flail assembly includes the rotatable shaft 38 (supported at each end by housing-attached bearings 47) and a plurality of flexible flails 50 removably secured to the shaft. The flails are arranged and secured to the shaft so that they will produce a spiral configuration when the shaft is rotating in the same manner as employed in flail assembly 39 and having the same functionality. In addition, the auger action of flail assembly 46 will move the pulverized glass toward an outlet 20 that is located on the outer end 52 of the housing 16.

In the embodiment shown, a removable plastic liner 51 is also located within housing 16 and protects the interior surface of the housing from flying pieces of glass or metal as in the case of liner 45. It should be noted that the liners 45 and 51 may be removed from their associated housing by removing bolts 53, allowing removal of the housing end portions 44 and 52, and removing the sheet metal screws 55 that fasten the liners to their associated housings, as indicated above. The fact that the liners are essentially simple cylindrical sheets allows their convenient fabrication from planar sheets of appropriate materials.

More particularly, it will be appreciated that the liners can be manufactured of materials other than plastic, such as hardened steel. In this case, a rectangular steel plate of appropriate dimensions is rolled into tubular form for fitting within one of the corresponding housings 8 and 18, and is spot-welded to maintain its tubular form during shipping and insertion into the corresponding housing. When in place, the spot welds are cut, allowing the liner to spring outwardly slightly, conforming to the interior wall of the housing. A torch is then used to cut portions therefrom corresponding to the inlet and outlet openings. It will be appreciated that as the end portions 44 and 52 of housings 8 and 18 are made readily removable, the shaft and flail assemblies can similarly be conveniently repaired or replaced when worn or damaged.

FIG. 6 provides a cross-sectional view taken across the width of the device. In this view, the shafts and individual flails can be seen as well as a contact zone 54 located between the two housings. Housing 8 has a long, substantially rectangular opening 56 located in its side. The opening is contiguous to a similarly shaped opening 58 in the side of housing 16. These two openings join the interior of the two housings together and allow glass fragments to bounce between the two housings and be impacted by the flails of each of the two flail assemblies. This causes the glass fragments to become completely pulverized as they move toward the outer ends of the housings under the auger type action of the flail assemblies. When the glass reaches the outer end 44 of the shorter housing 8, it bounces into the longer housing 16 where it is moved in a controlled manner by flail assembly 46 to the outer end 52 of the housing. Once the fully pulverized glass reaches outlet 20, it falls through the outlet's center hole into a removable container or drum (not shown) or onto a conveyer (not shown).

To aid in reducing the amount of airborne glass particles that are sometimes released from the device, a water spray system may optionally be included. The spray system is shown in phantom in FIG. 3 wherein a hose or pipe 60 is connected to a source of water 62. A valve 64 is located in the hose adjacent the unit and functions to control the volume of water passing through the hose.

Attached to the outlet of the valve and mounted to the side of the device's inlet 10 is a spray nozzle 66. A fine spray of water introduced is effective to causes the fine glass particles to adhere to larger glass fragments and thereby reduce the amount of airborne glass dust at the outlet 20. The operation of the overall device is essentially unaffected by the added liquid.

Figure 7:
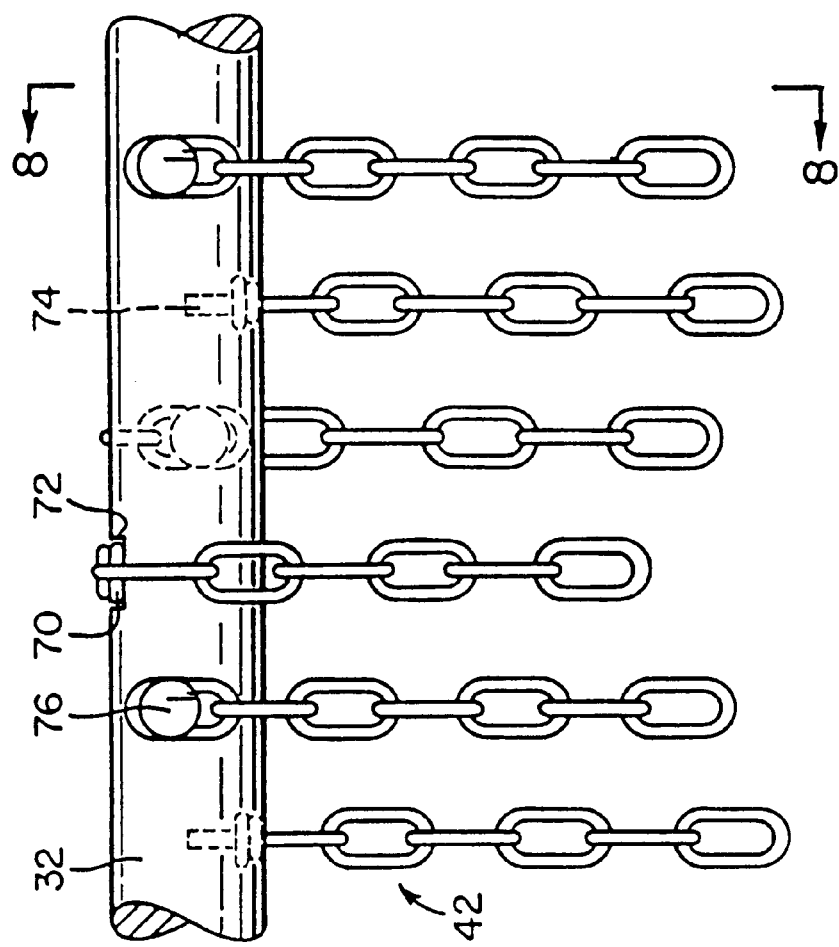
FIG. 7 is a side view of an end portion of one of the chain flail assemblies shown in FIG. 5.

FIGS. 7–9 provide detailed views of the structure of the chain flail assemblies at rest. In FIGS. 7 and 8, an end portion of flail assembly 39 is shown. It should be noted that a view of an end portion of flail assembly 46 would be identical to the portion shown in FIGS. 7 and 8.

In the shaft portion shown in FIGS. 7 and 8, the attachment structure for the chain flails 42 may be readily seen. Each of the flails is in the form of a length of chain that has an inner end link 70 fitted into a complementary slot 72 on the shaft. The slot has a flat bottom surface 73 and has a width at least equal to the width of link 70. A fastener 74 extends through the center opening of link 70 and a head portion 76 of the fastener contacts the outer surface of the link to hold the link in the slot. In this manner, link 70 is rigidly fixed to the shaft with its bottom surface in full contact with surface 73 of the slot. It should be noted that the link of the flail adjacent to link 70 can pivot on link 70 and thereby maintain the flexibility of the flail. By immovably fixing link 70 to the shaft, the shaft will not become worn as the rest of the flail pivots and moves on the end of link 70. It should also be noted that the slots 72 are rounded on one end and located in a staggered manner to enable the previously described spiral orientation of the flails when the shaft is spinning.

FIG. 9 shows a second embodiment of a flexible chain flail 80 which could be substituted for one or all of chain flails 42 or 50 describe above. As shown, flail 80 includes a plurality of interconnected links 82 that are contained within an elongated polyurethane or rubber cover 84. The cover is flexible and functions to protect the enclosed links and to minimize the amount of pulverized glass that collects on the links. By eliminating the direct contact between the glass particles and the links, the wear life of the links are extended.

As also shown, a rotatable hammer 86 is located at the distal end (furthest from the connection point to the shaft) of the chain flail 80. The hammer is made from an extremely hard material such as hardened steel, ceramic or carbide and is pivotally connected to the adjacent link 87. The connection is provided by the end of link 87 being received within an aperture 88 of the hammer. A pin 92 is inserted through the hammer 86 and the adjacent link 87 to secure the link 87 in place. The movable hammer is especially useful when a non-frangible item has been entered into the machine. When the hammer contacts the item, the connection allows the hammer to rotate about its connection to the adjacent link of the flail and thereby not become damaged or excessively worn by the impact with the item.

FIGS. 10 and 11 show a first embodiment of a flexible flail 94 that can be substituted for one or all of chain flails 42 or 50. The flail 94 includes an end member 96, preferably made of a hardened steel material, and designed to be secured to the shaft 32 or 38 of the flail assembly by a bolt or similar fastener 99 extending through an aperture 98. The fastener 99 is designed to be threadably engaged to a complementary threaded bore (such as 74) in the shaft. The fastener 99 thereby functions to secure and correctly position the end member 96 on the shaft's surface. The bores are drilled and threaded in the shaft so as to obtain the desired spiral orientation of the flails. As shown, the end member includes an arcuate surface 96a for mating with a cylindrical shaft.

Attached to the connector 96 is a unitary rigid link 100, also preferably made of a hardened steel material. The attachment is made using a press-fit pin 102 that extends through apertures 104 in the connector and which only loosely fits through an aperture 106 in the link 100. In this manner, the rod is able to pivot about pin 102. A plastic bushing 113 can be used to protect the pin 102. The outer or distal end of the link 100 has a pivotally attached hammer 108. The hammer member is also preferably made of a hardened steel material and is connected to the link 100 by a pivot pin 110. The pin is press-fit into aperture 114 of the link 100. Plastic bushings 113 at four locations keep the link 100 from contacting and wearing the connector 96 and the hammer 108. In this manner, the hammer can pivot on the end of the link 100 thereby providing the hammer with a second pivot point relative to the shaft.

FIGS. 12 and 13 show a further embodiment of the single-link flail of FIGS. 10 and 11. In this embodiment, the unitary rigid link 100 comprises two separate metallic members 120, 122. Members 120 and 122 are rigidly joined to one another by screws 124, threaded into solid bushing members 126, 128 so as to form a unitary rigid link. (It will be appreciated that the term "link" is used in this application in its rigorous mechanical engineering definition, that is, to refer to a single member defining two pivot points at opposed ends.) Fitting around the distal bushing 128 is a hammer 130. The size of the aperture in hammer 130 receiving bushing 128 is sufficiently loose that the hammer pivots freely about the bushing and can move angularly slightly. The width of hammer 130 is also slightly less than the length of bushing 128 so as to allow the hammer freedom to move between members 122 and 120. The end member 132 fits similarly over bushing 126 and between members 122 and 120, for similar reasons. As in the embodiment of FIGS. 10 and 11, the end member, link, and hammer are all fabricated of hardened steel, for durability in service.

As shown in FIG. 12, end member 132 is formed to define an arcuate surface 132a for mating with the outer cylindrical surface of the drive shaft, e.g., 32 or 38. Preferably, the end member 132, and hence the flail assembly 100, is affixed to the shaft 32 by bolt 134 extending radially through the center of shaft 32 and into threaded hole 132b formed in the end member 132. The shaft 32 is spot-faced or counterbored as indicated at 32a to conveniently receive the head of bolt 134. The same attachment is desirably used to affix the flails of the FIGS. 10 and 11 embodiment to the corresponding shafts.

The particular advantage of this attachment structure is that a person desiring to replace a worn or damaged flail assembly 100 simply unscrews bolt 134, discards the worn or damaged flail 100, and immediately threads a new flail into place onto bolt 134. The assembly is complete when bolt 134 is tightened. This replacement process can be carried out very rapidly and requires a minimum amount of tools or skill. Given that flails are relatively high wear items, their ready replacement is a great convenience to their users.

It is necessary to secure screws 124 in place so that they do not back out of bushings 126, 128 and allow the link and flail to become disassembled. One simple means for doing so would be to tack-weld the screws to members 120, 122. However, as mentioned, the hammers, the link members, the bushings, and the end members are all preferably fabricated of hardened steel materials for durability in the very difficult service of pulverizing glass and other materials. It is well understood in the art that it is undesirable to weld such hard materials as this destroys or damages their surface hardness. Therefore, small bores 136 are provided adjacent the countersunk bores in members 120, 122 for receiving the heads of flat-head screws 124, so as to be disposed just under the sharply beveled peripheral edges of the heads of screws 124, as shown. These bores 136 are provided so that a mechanic using a punch can deform the edge of the heads of screws 24 downwardly into bores 136, preventing screws 124 from unscrewing due to vibration experienced in service. This expedient provides a simple and reliable means of preventing screws 124 from becoming unscrewed that does not require tack-welding the screws to the members 120, 122.

To summarize the operation of the unit, the user inputs glass containers through the inlet 10. The containers break as they contact the flexible flails that are moving below the inlet. The resultant fragments of broken glass are then swept by the flails into the impact zone 54 between the two housings. The fragments bounce back and forth between the individual flails of the two flail assemblies and thereby become fully comminuted into small particles and reach a size wherein approximately ninety-five percent of the particles are between 1 and 0.1 millimeter in diameter. During the comminution process, the auger action of the two flail assemblies causes the glass particles to move toward the outer ends of each housing. When the particles reach the outer end 44 of the shorter housing 8, they are swept into the flails of the longer housing where they are then propelled in a controlled fashion toward the outlet 20. The particles then fall through the outlet's center hole 24 into a removable drum or similar container (not shown) or onto a conveyer (not shown).

The embodiments disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A comminuting apparatus comprising:

a first drum shaped hollow housing having a first end, a second end, an inlet and an outlet;

a first flail assembly operatively mounted within said first housing, said flail assembly comprising a central rotatable shaft supported by bearings at first and second ends of said shaft, said bearings being mounted to said housing, and further comprising a plurality of flails secured to an exterior surface of said cylindrical shaft, wherein each of said plurality of flails of the first flail assembly consists of an end member having an end surface for mating with said exterior surface of said shaft, a single elongated rigid link pivotally attached at a first end to said end member, and a hammer portion pivotally attached to a second end of said link, said shaft having a plurality of radial bores formed therein for receiving bolts extending through apertures in said end members for securing said flails to the shaft; and a motor means operatively connected to said first flail assembly to cause said flail assembly to rotate.

2. The comminuting apparatus of claim 1, wherein each said link comprises two parallel members joined at opposed ends thereof by first and second means pivotally joining said link to said end member and said hammer, respectively.

3. The comminuting apparatus of claim 2, wherein said first and second means pivotally joining said link to said end member and said hammer each comprise generally tubular bushing members received between said parallel members, said end member and said hammer each having bores formed therethrough for fitting over said bushings and being confined between said parallel members.

4. The comminuting apparatus of claim 3, wherein said bushing members have threaded bores formed in opposed ends thereof for receiving screws securing said parallel members to said bushings.

5. The comminuting apparatus of claim 4, wherein said screws are flathead screws having heads defining sharply beveled peripheral edges, and wherein said parallel members are provided with bores situated such that said peripheral edges may be readily deformed so as to protrude into said bores, locking said screws in place.

6. The comminuting apparatus of claim 1, wherein said apertures in said end members are threaded for receiving bolts extending through said radial bores in said shaft for securing said flails to said shaft.

7. The comminuting apparatus of claim 1, wherein said end surface of the end members of each of said flails is part-cylindrical, to mate with a cylindrical exterior surface of said shaft.

8. A replacement flail for a comminuting apparatus, consisting of:

an end member for being secured to a rotating shaft of a comminuting apparatus, said end member having a end surface for mating with a cylindrical exterior surface of said shaft, said end member having an aperture extending therethrough for receiving a bolt securing said replacement flail to the shaft;

a single elongated rigid link, pivotally attached at a first end to said end member; and a hammer portion, pivotally attached to a second end of said single elongated rigid link.

9. The replacement flail of claim 8, wherein said link comprises two elongated parallel members joined at opposed ends thereof by first and second means pivotally joining said link to said end member and said hammer, respectively.

10. The replacement flail of claim 9, wherein said first and second means pivotally joining said link to said end member and said hammer each comprise generally tubular bushing members received between said parallel members, said end member and said hammer each having bores formed therethrough for fitting over said bushings and being confined between said parallel members.

11. The replacement flail of claim 10, wherein said bushing members have threaded bores extending therethrough for receiving screws securing said parallel members to said bushings.

12. The replacement flail of claim 11, wherein said screws are flathead screws having heads defining sharply beveled peripheral edges, and wherein said parallel members are provided with bores situated such that said peripheral edges may be readily deformed so as to protrude into said bores, locking said screws in place.

13. The replacement flail of claim 7, wherein said aperture in said end member is threaded for receiving a bolt extending through a radial bore in said shaft for securing said flail to said shaft.

14. The replacement flail of claim 8, wherein said end surface of the end member of said flail is part-cylindrical, to mate with a cylindrical exterior surface of said shaft.

15. A glass pulverizing apparatus comprising:

a drum-shaped hollow housing having a first end, a second end, an inlet and an outlet;

a flail assembly operatively mounted within said housing, said flail assembly comprising a central rotatable shaft supported at first and second ends by said housing and further comprising a plurality of flexible flails releasably secured to an exterior surface of said shaft;

a motor means operatively connected to said flail assembly wherein said motor means functions to cause said flail assembly to rotate; and wherein at least one of said flexible flails of the flail assembly is enclosed within a flexible cover.

16. The assembly of claim 15 wherein at least one of said flexible flails of the flail assembly includes a hammer portion that is rotatably connected to a body portion of said flail.

17. The assembly of claim 15 wherein the housing has a removable end portion and a removable interior liner.

* * * * *